US012778822B2

(12) United States Patent
Svec et al.

(10) Patent No.: US 12,778,822 B2
(45) Date of Patent: Nov. 3, 2026

(54) BASE FLOOR PART FOR CARRYING A WHEELCHAIR AND AUTOMOBILE COMPRISING A BASE FLOOR PART FOR CARRYING A WHEELCHAIR

(71) Applicant: API CZ s.r.o., Slapy u Tábora (CZ)

(72) Inventors: Jiri Svec, Drazice (CZ); Miroslav Bartos, Tabor (CZ)

(73) Assignee: API CZ s.r.o., Slapy u Tábora (CZ)

( * ) Notice: Subject to any disclaimer, the term of this patent is extended or adjusted under 35 U.S.C. 154(b) by 637 days.

(21) Appl. No.: 18/319,734

(22) Filed: May 18, 2023

(65) Prior Publication Data

US 2023/0372168 A1 Nov. 23, 2023

(30) Foreign Application Priority Data

May 18, 2022 (EP) .................................... 22174130

(51) Int. Cl.

*A61G 3/08* (2006.01)
*B60K 1/04* (2019.01)
*B62D 25/20* (2006.01)

(52) U.S. Cl.

CPC .............. *A61G 3/0808* (2013.01); *B60K 1/04* (2013.01); *B62D 25/20* (2013.01); *B60K 2001/0438* (2013.01)

(58) Field of Classification Search

CPC .. A61G 3/0808; A61G 3/08; A61G 2220/145; B60K 1/04; B60K 2001/0438; B62D 25/20; B60R 22/22

USPC .............................................................. 410/7

See application file for complete search history.

(56) References Cited

U.S. PATENT DOCUMENTS

| | | | | |
|---|---|---|---|---|
| 5,137,413 A | | 8/1992 | Ressler | |
| 10,493,893 B2 | * | 12/2019 | Matsuoka | B60P 1/436 |
| 2020/0129350 A1 | * | 4/2020 | Collett | B60P 1/433 |
| 2022/0047437 A1 | | 2/2022 | Bartos et al. | |

FOREIGN PATENT DOCUMENTS

| | | | | |
|---|---|---|---|---|
| CA | 2964788 A1 | * | 11/2015 | A61G 3/061 |
| EP | 0390431 A2 | * | 10/1990 | A61G 3/061 |
| EP | 2293755 B1 | | 11/2011 | |
| EP | 3476379 A1 | | 5/2019 | |

OTHER PUBLICATIONS

Apr. 5, 2024 (EP) Office Action—App. 22174130.9.
Oct. 13, 2022 (EP) European Search Report—App. 22174130.9.

* cited by examiner

*Primary Examiner* — Amy R Weisberg
*Assistant Examiner* — Philip C Adams
(74) *Attorney, Agent, or Firm* — Banner & Witcoff, Ltd.

(57) ABSTRACT

A base floor part for carrying a wheelchair may be adapted to be connected to a body of an automobile. The automobile may include a battery for providing at least part of a driving force of the automobile. The base floor part may be configured such that the base floor part may be arranged at least partly above the battery.

21 Claims, 4 Drawing Sheets

BASE FLOOR PART FOR CARRYING A WHEELCHAIR AND AUTOMOBILE COMPRISING A BASE FLOOR PART FOR CARRYING A WHEELCHAIR

CROSS REFERENCE TO RELATED APPLICATIONS

This patent application claims priority to European Patent Application No. 22174130.9, filed May 18, 2022, which is incorporated herein by reference in its entirety.

BACKGROUND

Field

The present disclosure relates to a base floor part for carrying a wheelchair adapted to be connected to a body of an automobile and to an automobile comprising a base floor part for carrying a wheelchair. The disclosure also relates to a system comprising such a base floor part or such an automobile and a wheelchair.

Related Art

In order to make vehicles suitable for wheelchair users, the OEM-side-mounted vehicle floor is often removed to the extent that essentially only the vehicle body, including the vehicle body floor and vehicle body side parts, remains. A separately produced vehicle floor is then mounted on the vehicle body. In comparison to the OEM-sided vehicle floor, the replacement floor is designed in such a way that considerably more space is available, especially in the vertical direction, so that even a wheelchair user can sit upright on the wheelchair in the vehicle interior and is safely accommodated. Usually, vehicle ramps are attached to the replacement floor in such a way that they can still be swiveled so that the wheelchair user can easily enter and leave the vehicle.

With growing environmental awareness, it gets more and more important to make electrically powered vehicles suitable and accessible for wheelchairs. Usually electrically powered vehicles have more components that need to be considered when installing a base floor part for carrying the wheelchair in the vehicle. In particular, the battery for providing the driving force of the electrically powered vehicle can be very large. EP 3 476 379 A1 proposes a method for installing a wheelchair bay in an electrically powered vehicle, wherein the wheelchair bay is located behind the battery in the longitudinal direction of the vehicle.

As there are many different types of vehicles, there are vehicles that comprise a smaller rear cargo space and/or a larger battery than the vehicle in EP 3 476 379 A1, so that with the method proposed in EP 3 476 379 A1 it is not possible to install a base floor part for carrying a wheelchair in those vehicles behind the battery.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
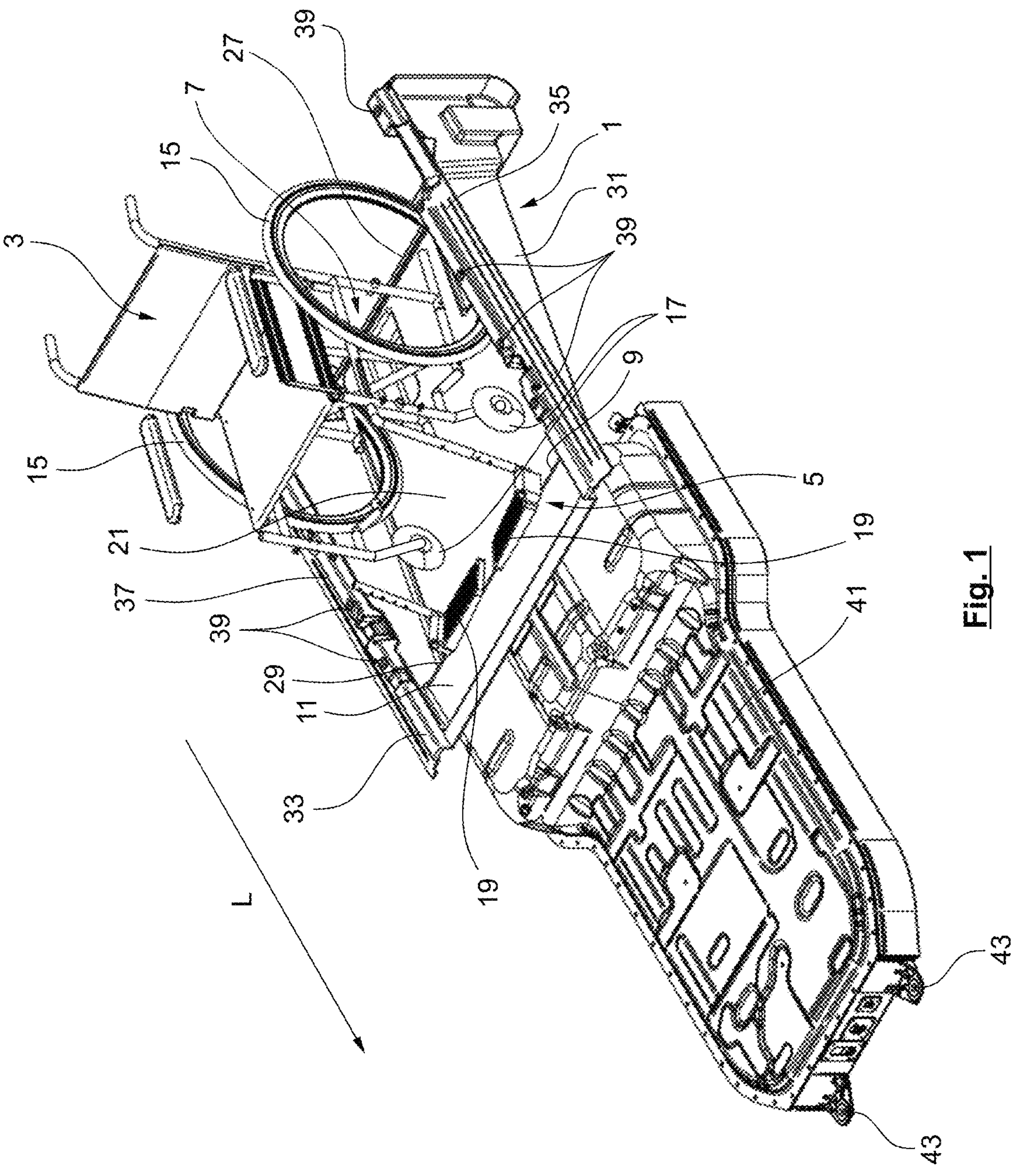
FIG. 1 shows a base floor part according to an aspect of the present disclosure carrying in an assembled state with a battery of an automobile carrying a wheelchair.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, and components, have not been described in detail to avoid unnecessarily obscuring embodiments of the disclosure.

It is an object of the present disclosure to overcome the disadvantages of the state of the art, in particular to provide a base floor part that uses the installation space available for the base floor part in a more efficient way so that it can be implemented in a larger number of vehicles, in particular in vehicles with little installation space for the base floor part such as electrically powered vehicles.

According to a first aspect of the present disclosure, a base floor part for carrying a wheelchair is provided. The base floor part is adapted to be connected to a body of an automobile, in particular an electrically powered automobile. The connection between the base floor part and the automobile body can be realized for example by gluing and/or screwing. The base floor part can be adapted to replace the OEM-sided manufactured vehicle floor in order to convert the automobile into a wheelchair accessible automobile. Therefore, the base floor part can comprise predefined attachment sections configured in design such that they may be attached to corresponding attachment sections of the automobile body where the OEM-sided original vehicle floor has been attached to. In particular, the base floor part can be designed and configured such that a wheelchair can be stored on it in the rear cargo space of the automobile. The base floor part can be made of plastic or composite material, in particular fiberglass, and/or can be manufactured by injection or resin transfer molding. For example, a mold may be used for the fiberglass material and vacuum to fill the mold. It is also possible to manufacture the base floor part from sheet metal on a press.

The base floor part according to the first aspect is adapted to be connected to an automobile that comprises a battery for providing at least part of a driving force of the automobile, such as an electric automobile or a hybrid automobile. The battery for providing at least part of the driving force, that can also be referred to as traction battery, can provide a high voltage of about 400 to 1000 V. Further the traction battery can have a high capacity of 50 to 100 kWh. The traction battery can be very heavy and way up to 400 kg. By these features, the battery for providing the driving force can be easily distinguished from other batteries of the automobile, such as a conventional automobile battery having a capacity of about 0.85 kWh, as well as additional batteries of the automobile and/or a wheelchair access system connected to the base floor part, such as a battery of a lifting mechanism to pull or lift the wheelchair onto the base floor part. It should be clear that the term battery within the meaning of the present disclosure refers to the traction battery for providing at least part of a driving force of the automobile and does not refer to other batteries that might be present in the automobile and/or the wheelchair access system.

The base floor part extends in a longitudinal direction, wherein a wheelchair can be pushed or driven onto the base floor part from a rear end in longitudinal direction of the base floor part. The longitudinal direction of the base floor part can extend in a horizontal direction. In an aspect of the disclosure, in an assembled state, in which the base floor part is connected to the automobile body, the longitudinal direction of the base floor part is arranged parallel to a longitudinal direction of the automobile. The longitudinal direction of the automobile is defined by the driving direction of the automobile.

According to the first aspect of the disclosure, the base floor part is designed in such a way, that it can be arranged at least partly above the battery. In the assembled state, the base floor part and the battery overlap in a vertical direction over a certain distance in longitudinal direction of the base floor part and/or the automobile. In other words, is the base floor part within this distance arranged above the battery in vertical direction. By overlapping the base floor part and the battery, the base floor part can be installed in automobiles with a smaller rear cargo space and/or a bigger traction battery, because the base floor part can at least partly be installed in the installation space normally occupied by the battery. Another advantage is that the same base floor part can be used for different automobiles because the length of overlapping between the base floor part and the battery can be changed flexibly. In other words, the portion of the base floor part overlapping with the battery can be adapted without changing the base floor part. Further no modifications and/or relocation of the battery is necessary to install the base floor part in the automobile. Therefore, the base floor part according to the first aspect provides a cheap, flexible and reliable way to install a base floor part in an automobile and at the same time enables to use the installation space in a very efficient way. The base floor part therefore makes it possible to make even automobiles with a small rear cargo space accessible for wheelchairs.

In an example embodiment, the base floor part comprises a substantially horizontal battery section. In longitudinal direction of the base floor part, the battery section can be arranged at the forward end of the base floor part. The battery section comprises a substantially horizontal top side and/or a substantially horizontal bottom side. In an aspect of the disclosure, both, the top side and the bottom side, are substantially horizontal, so that they extend parallel to each other. Hence, the battery section can have a substantially constant wall thickness, so that the battery section and the base floor part can be manufactured in an easy and cheap way. In this embodiment the base floor part is designed in such a way, that the horizontal battery section can be arranged at least partly above the battery.

In a further example embodiment, the battery section has a length between 10 cm and 30 cm, preferably between 15 cm and 25 cm or about 20 cm. In this embodiment the base floor part can be designed in such a way, that the battery section can be arranged above the battery substantially over the whole length of the battery section, to provide a base floor part requiring minimal installation space.

According to a second aspect of the present disclosure, that can be combined with the previous aspects and example embodiments, a base floor part for carrying a wheelchair is provided. The base floor part is adapted to be connected to a body of an automobile, in particular an electrically powered automobile. The connection between the base floor part and the automobile body can be realized for example by gluing and/or screwing. The base floor part can be adapted to replace the OEM-sided manufactured vehicle floor in order to convert the automobile into a wheelchair accessible automobile. Therefore, the base floor part can comprise predefined attachment sections configured in design such that they may be attached to corresponding attachment sections of the automobile body where the OEM-sided original vehicle floor has been attached to. In particular, the base floor part can be designed and configured such that a wheelchair can be stored on it in the rear cargo space of the automobile. The base floor part can be made of plastic or composite material, in particular fiberglass, and/or can be manufactured by injection or resin transfer molding. For example, a mold may be used for the fiberglass material and vacuum to fill the mold. It is also possible to manufacture the base floor part from sheet metal on a press.

Wheelchairs in general comprise two large rear wheels and two smaller front wheels. Normally a wheelchair also comprises a seat for the wheelchair user and a foot rest, where the wheelchair user can place his feet. Often the foot rest is arranged forward of the front wheels and/or at least partly protrudes over the front wheels in forward direction. Commercially available wheelchairs often have a total length of 120 cm or in the case of electric wheelchairs a length of 130 cm from a forward end of the foot rest to a rearward end of the rear wheels. The width of commercially available wheelchairs can be between 58 cm and 72 cm.

The base floor part extends in a longitudinal direction, wherein a wheelchair can be pushed or driven onto the base floor part from a rear end in longitudinal direction of the base floor part. The longitudinal direction of the base floor part can extend in a horizontal direction. In an aspect of the disclosure, in an assembled state, in which the base floor part is connected to the automobile body, the longitudinal direction of the base floor part is arranged parallel to a longitudinal direction of the automobile. The longitudinal direction of the automobile is defined by the driving direction of the automobile.

The base floor part according to the second aspect comprises a wheelchair storage section configured for carrying the rear wheels and the front wheels of the wheelchair. With other words is the wheelchair storage section configured to completely carry the wheelchair, meaning that the front wheels and the rear wheels can be placed on the wheelchair storage section at the same time. Therefore, the wheelchair storage section has a length and a width large enough to carry all wheels of the wheelchair at the same time. In the longitudinal direction of the base floor part, the wheelchair storage section can be arranged at a rear end of the base floor part. A rear end of the wheelchair storage section can be connected for example to a ramp for enabling access for the wheelchair onto the wheelchair storage section.

According to the second aspect of the disclosure, a top side of the wheelchair storage section is inclined at an angle between 1% and 15% with respect to a horizontal direction.

In particular, the wheelchair storage section can be inclined at an angle of less than 12%, 9% or 3% with respect to the horizontal direction. As the wheelchair storage section is configured to carry the front wheels and the rear wheels, the wheelchair is inclined at the same angle as the wheelchair storage section, when stored on the wheelchair storage section. With the inclined wheelchair storage section, it is possible to increase the effective length of the wheelchair storage section that can be used to store the wheelchair, in particular to carry the wheels of the wheelchair, within the same rear cargo space of the automobile, compared to a wheelchair storage section extending in horizontal direction. Hence, with the base floor part according to this aspect it is possible to make automobiles with smaller rear cargo space, for example because of a large traction battery in electrically powered automobiles, accessible for wheelchairs without the need to change the automobile body and without the need to change or relocate the traction battery of the automobile. With a smaller inclination angle the comfort for the wheelchair user can be increased but at the same time the effective length of the wheelchair storage section is reduced. The inventors of the present disclosure found out, that with an inclination angle between 1 and 15°, preferably less than 12%, 9% or 3% an optimum between cheap installation of the base floor part, efficient use of the available installation space and comfort for the wheelchair user can be reached.

According to an example embodiment, a bottom side of the wheelchair storage section is inclined at the same angle with respect to the horizontal direction as the top side of the wheelchair storage section. In this embodiment the top side and the bottom side extend parallel to each other, so that the wheelchair storage section has a substantially constant wall thickness. A base floor part according to this embodiment can be manufactured in an easy and cheap way and/or less material is required for manufacturing the base floor part.

According to another example embodiment, the top side of the wheelchair storage section has a constant inclination angle over the entire length of the wheelchair storage section. This way the wheelchair can be pushed or driven onto the wheelchair storage section in an easy way without the need to overcome edges on the top surface between portions of the top surface with different inclination angles and at the same time the base floor part can be manufactured in an easy and cheap way. Additionally, or alternatively, the bottom side of the wheelchair storage section has a constant inclination angle over the entire length of the wheelchair storage section.

According to a further example embodiment, the wheelchair storage section has a length that is shorter than a total length of the wheelchair, in particular shorter than 120 cm. In an aspect of the disclosure, the wheelchair storage section can have a length between 90 cm and 110 cm, preferably about 100 cm or 102 cm. The wheelchair storage section may be adapted to carry the front and rear wheels of the wheelchair, while the footrest can be located outside of the wheelchair storage section at a forward end of the wheelchair storage section. With this embodiment a base floor part requiring minimal installation space is provided.

According to a third aspect of the present disclosure, that can be combined with the previous aspects and example embodiments, a base floor part for carrying a wheelchair is provided. The base floor part is adapted to be connected to a body of an automobile, in particular an electrically powered automobile. The connection between the base floor part and the automobile body can be realized for example by gluing and/or screwing. The base floor part can be adapted to replace the OEM-sided manufactured vehicle floor in order to convert the automobile into a wheelchair accessible automobile. Therefore, the base floor part can comprise predefined attachment sections configured in design such that they may be attached to corresponding attachment sections of the automobile body where the OEM-sided original vehicle floor has been attached to. In particular, the base floor part can be designed and configured such that a wheelchair can be stored on it in the rear cargo space of the automobile. The base floor part can be made of plastic or composite material, in particular fiberglass, and/or can be manufactured by injection or resin transfer molding. For example, a mold may be used for the fiberglass material and vacuum to fill the mold. It is also possible to manufacture the base floor part from sheet metal on a press.

The base floor part extends in a longitudinal direction, wherein a wheelchair can be pushed or driven onto the base floor part from a rear end in longitudinal direction of the base floor part. The longitudinal direction of the base floor part can extend in a horizontal direction. In an assembled state, in which the base floor part is connected to the automobile body, the longitudinal direction of the base floor part may be arranged parallel to a longitudinal direction of the automobile. The longitudinal direction of the automobile is defined by the driving direction of the automobile.

The base floor part according to the third aspect comprises in a longitudinal direction of the base floor part a rearward wheelchair storage section and a forward section arranged at a forward end of the rearward wheelchair storage section. The wheelchair storage section is configured for carrying the rear wheels and the front wheels of the wheelchair. With other words is the wheelchair storage section configured to completely carry the wheelchair, meaning that the front wheels and the rear wheels can be placed on the wheelchair storage section at the same time. Therefore, the wheelchair storage section has a length and a width large enough to carry all wheels of the wheelchair at the same time. In the longitudinal direction of the base floor part, the wheelchair storage section can be arranged at a rear end of the base floor part. A rear end of the wheelchair storage section can be connected for example to a ramp for enabling access for the wheelchair onto the wheelchair storage section. In an aspect of the disclosure, the wheelchair storage section may be inclined to increase the effective length of the wheelchair storage section that can be used to store the wheelchair. The forward section may extend in a horizontal direction and/or be located at least partly above a battery for providing at least part of a driving force of the automobile.

According to the third aspect, a step is formed between the rearward wheelchair storage section and the forward section, such that the forward section is stepwise elevated from the forward end of the rearward wheelchair storage section. With the step it is possible to lower the forward end of the wheelchair storage section with regard to the forward section. At the step, a distance in vertical direction between the base floor part and the ground, that can be referred to as ground clearance increases abruptly in longitudinal direction of the base floor part. The step allows to use the installation space available for the base floor part in a more flexible and efficient way. With the step, the base floor part can easily be adapted to different components and/or conditions defining the installation space in the automobile, such as a traction battery and/or the length of the installation space. When the automobile comprises a large traction battery it is possible to arrange the forward section above the battery without the need to raise the forward end of the wheelchair storage section which would normally lead to a reduced height in vertical direction in the automobile interior, so that a wheelchair user might not be able to sit upright and/or to an increased inclination angle of the wheelchair storage section which reduces the comfort for the wheelchair user. Additionally, or alternatively, the step can be used to lower the forward end of the wheelchair storage section so that the height in vertical direction in the rear cargo space available for the wheelchair user can be increased and/or the distance in vertical direction between the forward end and a rearward end of an inclined wheelchair storage section can be reduced. With the shorter distance in vertical direction between the forward end and the rearward end of the wheelchair storage section, the inclination angle of the wheelchair storage section can be reduced, which increases the comfort for the wheelchair user.

According to an example embodiment, the step comprises a lower end and an upper end in vertical direction. The upper end of the step can be formed by a rearward end of the forward section and the lower end of the step can be formed by the forward end of the wheelchair storage section. The upper end and/or the lower end of the step extend perpendicular to the longitudinal direction of the base floor part. Additionally, or alternatively the upper end and/or the lower end are linear.

According to another example embodiment, the step comprises a substantially planar rearward side and/or a substantially planar forward side in longitudinal direction of the base floor part. The rearward side of the step faces the wheelchair, and the forward side of the step faces the forward end of the automobile and a battery that the automobile can comprise. In an aspect of the disclosure, the rearward side and the forward side extend parallel to each other, so that the step has a substantially constant wall thickness. The step and the base floor part according to this embodiment can be manufactured in an easy and cheap way. The step can have the same wall thickness as the wheelchair storage section and/or the forward section, but the step can also have a different wall thickness than the wheelchair storage section and/or the forward section.

According to a further example embodiment, the step extends in a vertical direction or is inclined with respect to the vertical direction at an angle between 1 and 30°. In an aspect of the disclosure, the step can be inclined about 15° with respect to the vertical direction. With a vertical step the effect of lowering the forward end of the wheelchair storage section with regard to the forward section can be maximized. However, an inclination of the step can have the advantage that the base floor part can be manufactured in an easier and cheaper way and that the step can be adapted to the shape of other components of the automobile, such as a battery and/or an automobile body.

According to another example embodiment, the step has height in vertical direction between 10 mm and 80 mm, preferably between 30 mm and 70 mm or about 60 mm. The inventors of the present disclosure found out that a step height in this range offers maximal comfort to the wheelchair user, when the footrest of the wheelchair is arranged above the forward section and at the same time allows to use the available rear cargo space in an efficient way.

According to a further example embodiment, the base floor part is manufactured in one piece. In an aspect of the disclosure, the horizontal section, the step and the wheelchair storage section are manufactured in one piece. In this way the base floor part can be manufactured in an easy and cheap way. Another advantage is that the base floor part can be installed in the automobile in an easy and cheap way without the need to mount separate parts of the base floor part before, during and/or after connecting the base floor part to the automobile body.

According to a further aspect of the present disclosure that can be combined with the previous aspects and example embodiments, an automobile comprising a base floor part for carrying a wheelchair is provided. The base floor part of the automobile can be configured according to one of the previous aspects and/or example embodiments and can have the same features and advantages described for the previous aspects and/or example embodiments. The automobile further comprises an automobile body that the base floor part can be connected to. The automobile further comprises a battery for providing at least part of a driving force of the automobile. Hence, the automobile can be an electric automobile or a hybrid automobile.

The base floor part extends in a longitudinal direction, wherein a wheelchair can be pushed or driven onto the base floor part from a rear end in longitudinal direction of the base floor part. The longitudinal direction of the base floor part can extend in a horizontal direction. In an assembled state, in which the base floor part is connected to the automobile body, the longitudinal direction of the base floor part may be arranged parallel to a longitudinal direction of the automobile. The longitudinal direction of the automobile is defined by the driving direction of the automobile.

According to the further aspect of the disclosure, the base floor part is arranged at least partly above the battery. In the assembled state, the base floor part and the battery overlap in a vertical direction over a certain distance in longitudinal direction of the base floor part and/or the automobile. In other words, is the base floor part within this distance arranged above the battery in vertical direction. By overlapping the base floor part and the battery, the base floor part can be installed in automobiles with a smaller rear cargo space and/or a bigger traction battery, because the base floor part can at least partly be installed in the installation space normally occupied by the battery. Another advantage is that the same base floor part can be used for different automobiles because the length of overlapping between the base floor part and the battery can be changed flexibly. In other words, the portion of the base floor part overlapping with the battery can be adapted without changing the base floor part. Further no modifications and/or relocation of the battery is necessary to install the base floor part in the automobile. Therefore, the automobile according to the first aspect provides a cheap, flexible and reliable way to install the base floor part in the automobile and at the same time enables to use the installation space in a very efficient way.

In an example embodiment, a ground clearance between the ground, for example the road on which the automobile stands and/or is driven, and a bottom side of the battery is larger than 165 mm, preferably larger than 195 mm. The ground clearance is the distance in vertical direction between the battery and the ground. The ground clearance according to this embodiment ensures that the battery does not collide with the ground even in case of bumps on the ground and/or the additional weight of the base floor part and/or the wheelchair and the wheelchair user. Additionally, or alternatively, the battery can be arranged in an initial position as provided by a manufacturer of the automobile. In other words, is the battery arranged in the position as provided by the OEM so that no modification and/or no relocation of the battery is necessary. With the battery arranged in the initial position it is possible to install the base floor part in the automobile in an easy and cheap way with no additional mounting steps before the base floor part is connected to the automobile body.

In an example embodiment, the base floor part comprises a substantially horizontal forward section located forward in a longitudinal direction of the automobile. The horizontal forward section can comprise a substantially horizontal top surface and/or a substantially horizontal bottom surface. In this embodiment the horizontal section is arranged at least partly above the battery.

In a further example embodiment, the base floor part is arranged above the battery over at least 10%, preferably about 20%, of a length of the base floor part in longitudinal direction of the base floor part. In an aspect of the disclosure, the forward section is arranged above the battery over at least 50%, preferably 70% or at least 90%, of a length of the forward section.

According to another example embodiment, a top side of the battery and at least part of a bottom side of the base floor part, in particular at least part of a bottom side of the forward section, extend parallel to each other. In this embodiment, the bottom side of the base floor part or the forward section can be adapted to the top side of the battery, to be able to arrange the base floor part as low as possible in vertical direction to increase the height available for the wheelchair user in the interior of the vehicle.

According to a further example embodiment, a gap between the bottom side of the forward section and the top side of the battery is between 5 mm and 15 mm, preferably between 8 mm and 12 mm or about 10 mm. With these gap dimensions the base floor part is not affected when the battery heats up during driving and the battery and the base floor part do not collide in case of bumps on the street and/or when the weight of the wheelchair and the wheelchair user acts on the base floor part when a wheelchair is stored on the base floor part.

According to a further aspect of the present disclosure that can be combined with the previous aspects and example embodiments, an automobile comprising a base floor part for carrying a wheelchair is provided. The base floor part of the automobile can be configured according to one of the previous aspects and/or example embodiments and can have the same features and advantages described for the previous aspects and/or example embodiments. The automobile further comprises an automobile body that the base floor part can be connected to.

The base floor part extends in a longitudinal direction, wherein a wheelchair can be pushed or driven onto the base floor part from a rear end in longitudinal direction of the base floor part. The longitudinal direction of the base floor part can extend in a horizontal direction. In an assembled state, in which the base floor part is connected to the automobile body, the longitudinal direction of the base floor part may be arranged parallel to a longitudinal direction of the automobile. The longitudinal direction of the automobile is defined by the driving direction of the automobile. The base floor part comprises a wheelchair storage section configured for carrying the rear wheels and the front wheels of the wheelchair. With other words is the wheelchair storage section configured to completely carry the wheelchair, meaning that the front wheels and the rear wheels can be placed on the wheelchair storage section at the same time. Therefore, the wheelchair storage section has a length and a width large enough to carry all wheels of the wheelchair at the same time. In the longitudinal direction of the base floor part, the wheelchair storage section can be arranged at a rear end of the base floor part. A rear end of the wheelchair storage section can be connected for example to a ramp for enabling access for the wheelchair onto the wheelchair storage section.

According to the further aspect of the disclosure, a top side of the wheelchair storage section is inclined at an angle between 1% and 15% with respect to a horizontal direction. In particular, the wheelchair storage section can be inclined at an angle of less than 12%, 9% or 3% with respect to the horizontal direction. As the wheelchair storage section is configured to carry the front wheels and the rear wheels, the wheelchair is inclined at the same angle as the wheelchair storage section, when stored on the wheelchair storage section. With the inclined wheelchair storage section, it is possible to increase the effective length of the wheelchair storage section that can be used to store the wheelchair, in particular to carry the wheels of the wheelchair, within the same rear cargo space of the automobile, compared to a wheelchair storage section extending in horizontal direction. Hence, with the automobile according to this aspect it is possible to install the base floor part in a smaller rear cargo space, for example because of a large traction battery in electrically powered automobiles, without the need to change the automobile body and without the need to change or relocate the traction battery of the automobile. With a smaller inclination angle the comfort for the wheelchair user can be increased but at the same time the effective length of the wheelchair storage section is reduced. The inventors of the present disclosure found out, that with an inclination angle between 1 and 15°, preferably less than 12%, 9% or 3% an optimum between cheap installation of the base floor part, efficient use of the available installation space and comfort for the wheelchair user can be reached.

According to a further aspect of the present disclosure that can be combined with the previous aspects and example embodiments, an automobile comprising a base floor part for carrying a wheelchair is provided. The base floor part of the automobile can be configured according to one of the previous aspects and/or example embodiments and can have the same features and advantages described for the previous aspects and/or example embodiments. The automobile further comprises an automobile body that the base floor part can be connected to.

The base floor part extends in a longitudinal direction, wherein a wheelchair can be pushed or driven onto the base floor part from a rear end in longitudinal direction of the base floor part. The longitudinal direction of the base floor part can extend in a horizontal direction. In an assembled state, in which the base floor part is connected to the automobile body, the longitudinal direction of the base floor part may be arranged parallel to a longitudinal direction of the automobile. The longitudinal direction of the automobile is defined by the driving direction of the automobile. The base floor part comprises a rearward section located rearward in a longitudinal direction of the automobile and a forward section located forward in the longitudinal direction of the automobile. The rearward section is configured for carrying the rear wheels and the front wheels of the wheelchair. With other words is the wheelchair storage section configured to completely carry the wheelchair, meaning that the front wheels and the rear wheels can be placed on the wheelchair storage section at the same time. Therefore, the wheelchair storage section has a length and a width large enough to carry all wheels of the wheelchair at the same time. In the longitudinal direction of the base floor part, the wheelchair storage section can be arranged at a rear end of the base floor part. A rear end of the wheelchair storage section can be connected for example to a ramp for enabling access for the wheelchair onto the wheelchair storage section. The wheelchair storage section may be inclined to increase the effective length of the wheelchair storage section that can be used to store the wheelchair. The forward section may extend in a horizontal direction and/or be located at least partly above a battery for providing at least part of a driving force of the automobile.

According to the further aspect, a step is formed between the rearward section and the forward section, such that the forward section is stepwise elevated from the forward end of the rearward section. With the step it is possible to lower the forward end of the rearward section with regard to the forward section. At the step, a distance in vertical direction between the base floor part and the ground, that can be referred to as ground clearance increases abruptly in longitudinal direction of the base floor part. The step allows to use the installation space available for the base floor part in a more flexible and efficient way. With the step, the base floor part can easily be adapted to different components and/or conditions defining the installation space in the automobile, such as a traction battery and/or the length of the installation space. When the automobile comprises a large traction battery it is possible to arrange the forward section above the battery without the need to raise the forward end of the rearward section which would normally lead to a reduced height in vertical direction in the automobile interior, so that a wheelchair user might not be able to sit upright, and/or to an increased inclination angle of the rearward section which reduces the comfort for the wheelchair user. Additionally, or alternatively, the step can be used to lower the forward end of the rearward section so that the height in vertical direction in the rear cargo space available for the wheelchair user can be increased and/or the distance in vertical direction between the forward end and a rearward end of an inclined rearward section can be reduced. With the shorter distance in vertical direction between the forward end and the rearward end of the rearward section, the inclination angle of the rearward section can be reduced, which increases the comfort for the wheelchair user.

According to another example embodiment, the automobile further comprises a battery for providing at least part of a driving force of the automobile. The battery has a predefined shape. A bottom side of the base floor part, in particular a bottom side of the forward section, and/or a forward side surface of the step facing the battery are at least partly adapted to the shape of the battery. In other words, the bottom side of the forward section and/or the forward side of the step can comprise the same shape as the battery. Due to this the base floor part can be arranged close to the battery and the available installation space can be used in an efficient way.

According to another example embodiment, a gap between a forward side of the step facing the battery and a side surface of the battery is between 5 mm and 15 mm, preferably between 8 mm and 12 mm or about 10 mm. With these gap dimensions the base floor part is not affected when the battery heats up during driving.

According to a further aspect of the present disclosure that can be combined with the previous aspects and example embodiments, a system comprising a base floor part for carrying a wheelchair adapted to be connected to an automobile and a wheelchair or a system comprising an automobile with a base floor part for carrying a wheelchair and a wheelchair is provided. The base floor part and/or the automobile can be configured according to one of the previous aspects and/or example embodiments and can have the same features and advantages described for the previous aspects and/or example embodiments.

The base floor part extends in a longitudinal direction, wherein a wheelchair can be pushed or driven onto the base floor part from a rear end in longitudinal direction of the base floor part.

The longitudinal direction of the base floor part can extend in a horizontal direction. In an assembled state, in which the base floor part is connected to the automobile body, the longitudinal direction of the base floor part may be arranged parallel to a longitudinal direction of the automobile. The longitudinal direction of the automobile is defined by the driving direction of the automobile.

The base floor part may comprise, in the longitudinal direction of the base floor part and/or the automobile, an inclined rearward section and a substantially horizontal forward section. The inclined rearward section is configured for carrying the wheelchair. According to this aspect of the disclosure, a length of the inclined rearward section in longitudinal direction of the base floor part is shorter than the wheelchair, in particular shorter than 120 cm, such that a footrest of the wheelchair is arranged above the horizontal forward section. With this embodiment a base floor part requiring minimal installation space is provided. To keep the wheelchair from rolling back when stored on the inclined rearward section, the wheelchair can for example be secured with one or more belts that are connected to the base floor part and/or the automobile.

A base floor part according to the disclosure is generally indicated with the reference sign 1 and an automobile according to the disclosure comprising a base floor part 1 is generally indicated with the reference sign 10.

Figure 2:
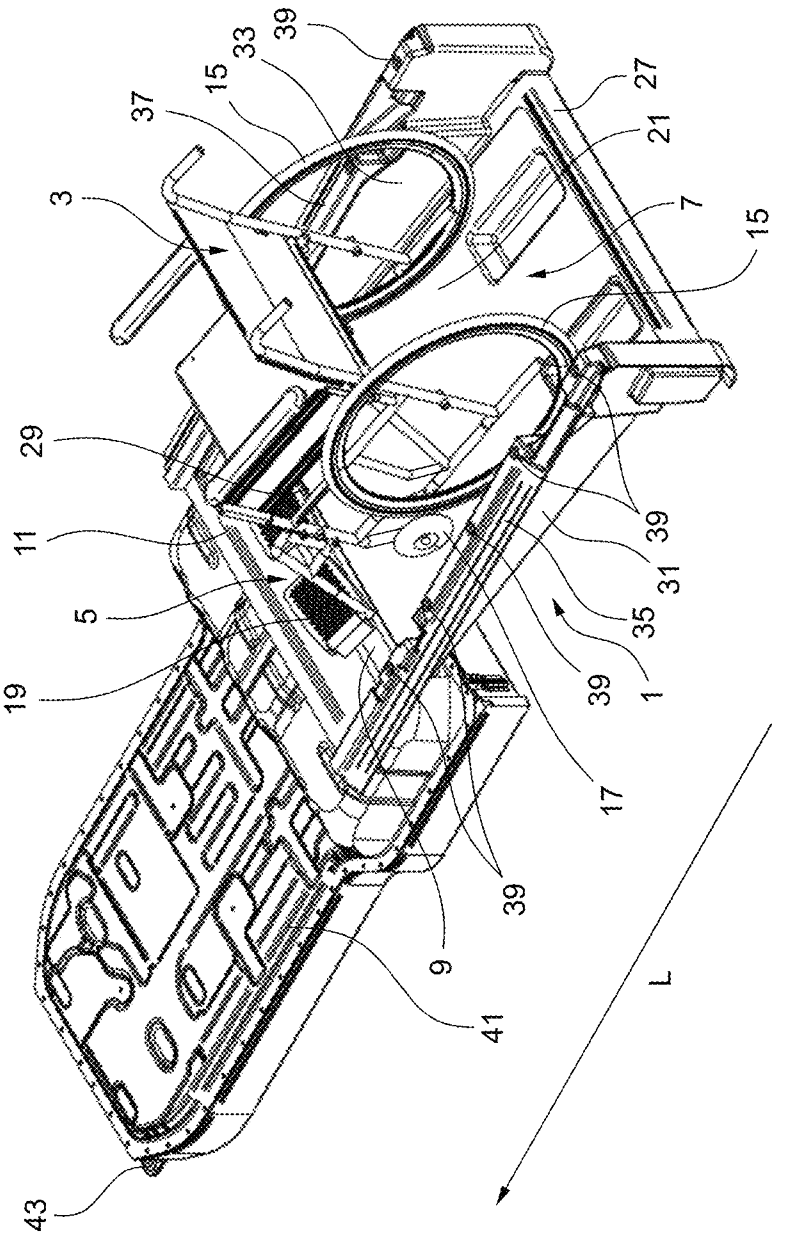
FIG. 2 shows the base floor part of FIG. 1 in a different perspective view.

FIGS. 1 and 2 show different perspective views of a base floor part 1 with a wheelchair 3 stored on the base floor part 1. The base floor part 1 comprises the following main parts: a horizontal battery section 5, an inclined wheelchair storage section 7 and a step 9 between the battery section 5 and the wheelchair storage section 7.

The base floor part 1 is manufactured in one piece. Hence, the horizontal section 5, the step 9 and the wheelchair storage section 7 are manufactured in one piece. The base floor part 1 can be made of plastic or composite material, in particular fiberglass, and/or can be manufactured by injection or resin transfer molding. For example, a mold may be used for the fiberglass material and vacuum to fill the mold. It is also possible to manufacture the base floor 1 part from sheet metal on a press.

Figure 3:
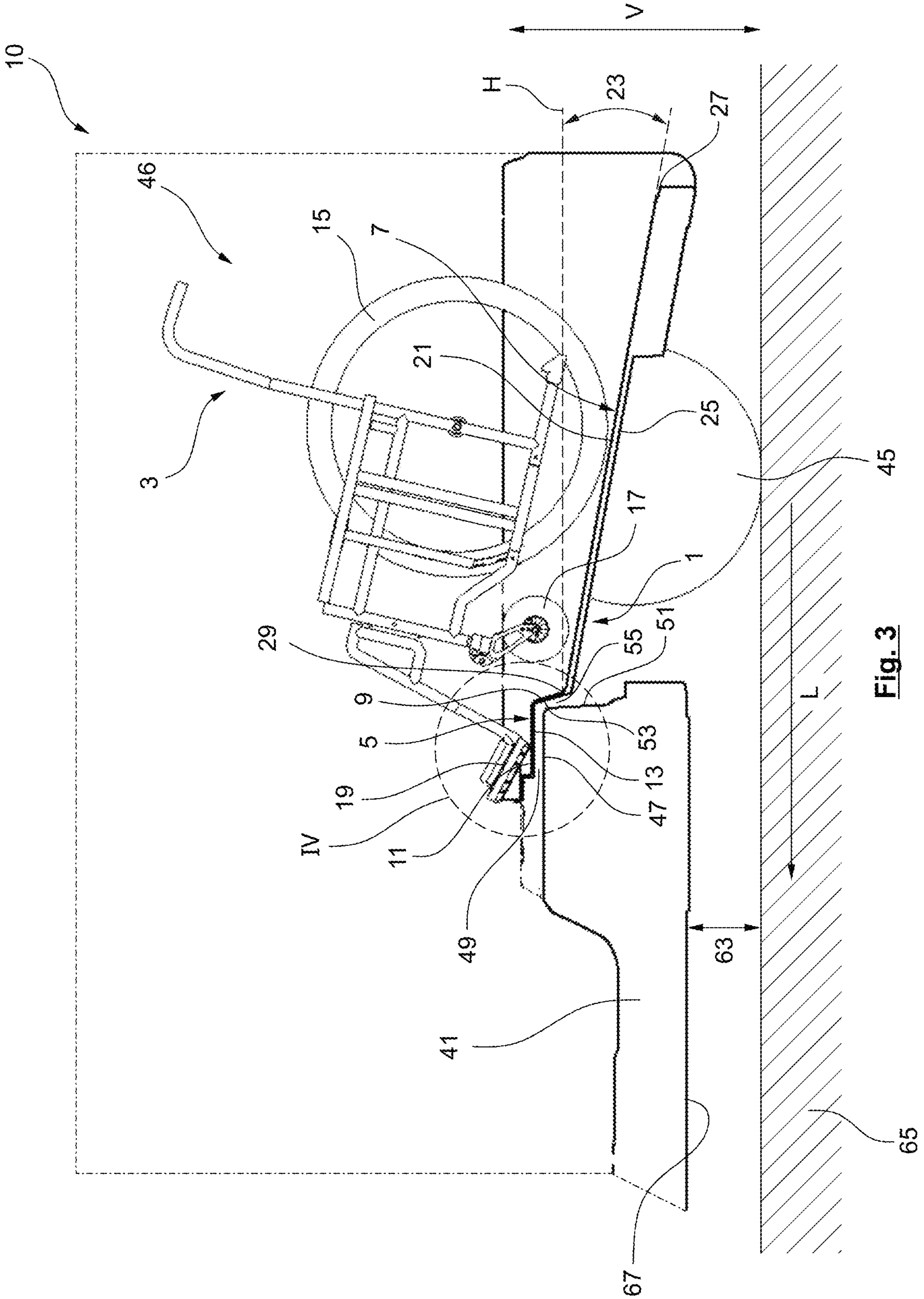
FIG. 3 shows a schematic view of the rear cargo space of an automobile according to an aspect of the present disclosure.

The base floor part 1 extends in a longitudinal direction L, wherein the wheelchair 3 can be driven or pushed onto the base floor part 1 from a rearward end 27 in longitudinal direction L of the base floor part. The battery section 5 is located forward in longitudinal direction L and comprises a horizontal top side 11 and a horizontal bottom side 13. As can be seen in FIG. 3, due to this the battery section 5 comprises a constant wall thickness over the whole length of the battery section 5 in longitudinal direction L. The wall thickness is also constant over the width of the horizontal section 5 perpendicular to the longitudinal direction L. In the example embodiment shown in FIGS. 1 and 2 the length of the horizontal section 5 in longitudinal direction L is about 20 cm.

The wheelchair storage section 7 is configured to carry the wheelchair 3. The wheelchair 3, as most commercially available wheelchairs, comprises two large rear wheels 15 and two smaller front wheels 17. The wheelchair 3 also comprises a foot rest 19, where a wheelchair user can place his feet. The foot rest 19 is arranged forward of the front wheels 17 in longitudinal direction L. Commercially available wheelchairs often have a total length of 120 cm from a forward end of the foot rest 19 to a rearward end of the rear wheels 15 and a width of 58 cm to 72 cm.

The wheelchair storage section 7 is located rearward in longitudinal direction L of the base floor part 1 and is configured to carry all for wheels of the wheelchair 3, namely the two rear wheels and the two front wheels 17 at the same time, as shown in FIGS. 1 and 2. Therefore the width of the wheelchair storage section 7 is larger than the width of the wheelchair 3 and the length of the wheelchair storage section 7 is larger than the distance between the rear wheels 15 and the front wheels 17. The wheelchair storage section 7 comprises a top side 21 that is inclined at an angle between 1° and 15°, preferably less than 12°, 9° or 3° with respect to a horizontal direction H. In FIG. 3 the inclination angle is indicated with reference sign 23. As can be seen in FIG. 3, a bottom surface 25 of the wheelchair storage section 7 is inclined with the same angle 23 with respect to the horizontal direction H as the top side 21, so that the wheelchair storage section 7 has a constant wall thickness over the entire length of the wheelchair storage section 7.

The wheelchair storage section 7 has a rearward end 27 in longitudinal direction L, that is the lowest point in vertical direction V of the wheelchair storage section 7. Respectively a forward end 29 of the wheelchair storage section 7 is the highest point in vertical direction V. As can be seen in FIG. 3, the top side 21 has a constant inclination angle 23 over the entire length of the wheelchair storage section 7 from the rearward end 27 to the forward end 29.

Figure 4:
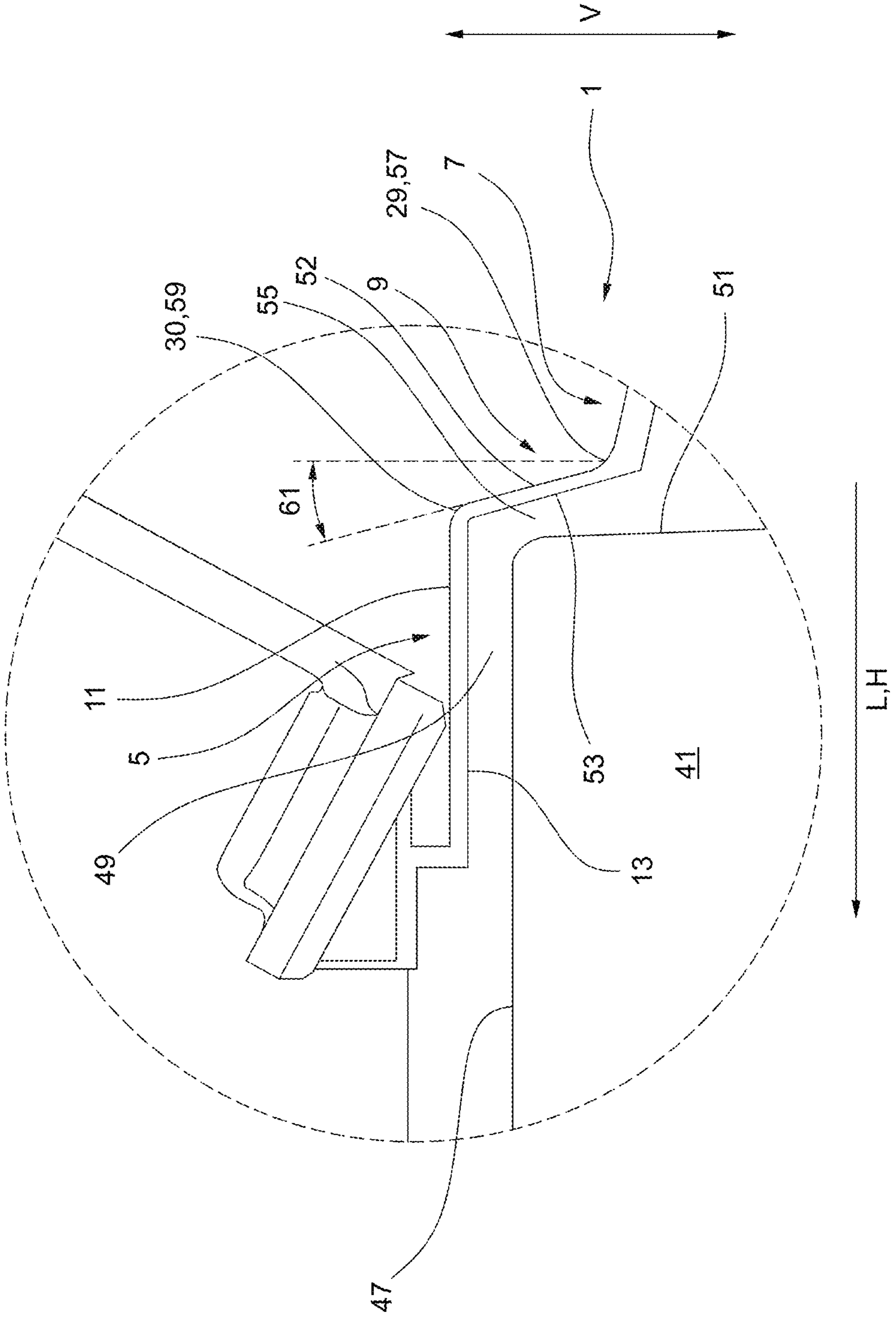
FIG. 4 shows a detailed view of the base floor part from FIG. 3 according to section IV in FIG. 3.

The step 9 is located between the battery section 5 and the wheelchair storage section 7. At the step 9 the battery section 5 is stepwise elevated from the forward end 29 of the wheelchair storage section 7. A detailed view of the step 9 is shown in FIG. 4. The step 9 extends between a lower end 57 formed by the forward end 29 of the wheelchair storage section 7 and an upper end 59 formed by a rearward end 30 of the forward section 5. The upper end 57 and the lower end 59 extend linear and perpendicular to the longitudinal direction L along the entire width of the forward section 5 and the wheelchair storage section 7. The step comprises a planar rearward side 52 facing the wheelchair 3 and a planar forward side 53 facing the battery 41. In the embodiment in FIG. 3, the rearward side 52 and the forward side 53 extend parallel to each other, so that the step 9 has a constant wall thickness. The step 9 is inclined with regard to the vertical direction V at an angle of about 15°, that is indicated in FIG. 4 with the reference sign 61. In the embodiment in FIG. 3, the height of the step 9 in vertical direction V, hence the distance in vertical direction V between the forward end 29 of the wheelchair storage section 7 and the top side 11 of the battery section 5 is about 60 mm.

In the embodiment in FIGS. 1 and 2, the battery section 5 and the wheelchair section 7 comprise side walls 31, 33 on both sides that protrude from the top surface 11 of the battery sections and the top surface 21 of the wheelchair storage section 7 in vertical direction V. The side walls 31, 33 each have a substantially horizontal top side 35, 37. The side walls 31, 33 comprise on the top sides 35, 37 a number of connection points 39 for connecting the base floor part 1 to a body of an automobile (not shown in FIGS. 1 and 2).

FIGS. 1 and 2 also show a battery 41 for providing at least part of a driving force of an automobile 10 according to the present disclosure or an automobile that the base floor part 1 is adapted to be connected to. The battery 41 has two connection points 43 for connecting the battery 41 to the body of the automobile 10.

The effects and advantages of the base floor part 1 according to the disclosure will be described in view of FIG. 3, that shows a schematic view of a rear cargo space 46 of an automobile 10 according to the disclosure with the base floor part 1 installed in the automobile 10.

The automobile 10 comprises a battery 41 for providing at least part of a driving force of the automobile 10. The base floor part 1 is connected to a body (not shown) of the automobile 10 in longitudinal direction L in the area of a rear suspension and the rear wheels 45 of the automobile 10, hence in the rear cargo space 46 of the automobile 10. In the embodiment in FIG. 3 a ground clearance of the battery, hence a distance in vertical direction between the ground 65 the automobile 10 is placed on and a bottom side 67 of the battery 41 is about 195 mm. This corresponds to the position in which the battery 41 is arranged when the automobile 10 comes from a manufacturer of the automobile 10 before the original vehicle floor is replaced with the base floor part 1. Hence no battery relocation or modification is necessary to install the base floor part 1 in the automobile 10.

Therefore, the geometry of the base floor part is adapted to the small rear cargo space in the following way to use the rear cargo space in an efficient way.

The battery section 5 of the base floor part 1 is arranged above the battery 41 over almost the entire length of the battery section 5. It can be seen in FIG. 3, that the battery 41 and the battery section 5 overlap in vertical direction V over almost the entire length of the forward section 5. By overlapping the forward section 5 and the battery 41, the base floor part 1 can be installed in a smaller rear cargo space and/or in automobiles with a bigger battery, because the base floor part 1 can at least partly be installed in the installation space normally occupied by the battery 41.

It can be seen in FIG. 3 and also in FIG. 4 that the bottom side 13 of the forward section 5 and the forward side 53 of the step 9 are adapted to the shape of the battery 41. Between the bottom side 13 of the battery section 5 and a top side 47 of the battery 41, that extend in the horizontal direction H parallel to each other, a gap 49 of about 10 mm is formed. These gap dimensions allow to place the base floor part 1 as low as possible without colliding with the battery 41 even if the ground 65 has bumps and/or the weight of the wheelchair 3 and/or the wheelchair user acts on the base floor part 1. It further prevents that the base floor part 1 is affected by rising temperatures of the battery 41 during driving of the automobile 10. Between a rear side surface 51 of the battery 41 and a forward side 53 of the step 9 facing the battery 41, a gap 55 of about 10 mm is formed. With these gap dimensions the base floor part 1 is not affected when the battery 41 heats up during driving but allows to install the base floor part 1 as far forward as possible.

The inclination of the wheelchair storage section 7 is a further feature that helps to reduce the rear cargo space 46 needed for installing the base floor part 1. The inclination of the wheelchair storage section 7 allows to increase the effective length of the wheelchair storage section 7 that can be used to store the wheelchair 3. The inventors of the present disclosure found out, that with an inclination angle 23 between 1 and 15°, preferably less than 12%, 9% or 3% an optimum between cheap installation of the base floor part 1, efficient use of the available installation space and comfort for the wheelchair user can be reached.

The step 9 allows to reduce the inclination angle 23 of the wheelchair storage section 7. With the step 9 the forward end 29 of the wheelchair storage section 7 can be lowered with regard to the battery section 5 that is arranged above the battery 41. Due to the lowered forward end 29, the distance in vertical direction V between the forward end 29 and the rearward end 27 of the wheelchair storage section 7 can be reduced. With the shorter distance in vertical direction V between the forward end 29 and the rearward end 27 the inclination angle 23 can be reduced, which increases the comfort for the wheelchair user. In addition, the height in vertical direction V in the rear cargo space available for the wheelchair user can be increased so that the wheelchair user can sit upright on the wheelchair 3 in the interior of the automobile.

Lastly, the needed rear cargo space 46 is further reduced by arranging the foot rest 19 of the wheelchair 3 above the battery section 5. This way the wheelchair storage section 7 can have a length that is shorter than the wheelchair 3, hence shorter 120 cm, and also shorter than the length of previously used base floor parts. In the embodiment in FIG. 3, the length of the wheelchair storage section 7 is about 102 cm.

The features disclosed in the above description, the figures and the claims may be significant for the realization of the disclosure in its different embodiments individually as in any combination.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 base floor part
10 automobile
3 wheelchair
5 horizontal battery section
7 inclined wheelchair storage section
9 step
11 forward section top side
13 forward section bottom side
15 wheelchair rear wheel
17 wheelchair front wheel
19 foot rest
21 wheelchair storage section top side
23 inclination angle
25 wheelchair storage section bottom side
27 wheelchair storage section rearward end
29 wheelchair storage section forward end
30 forward section rearward end
31, 33 side wall
35, 37 side wall top side
39 connection point base floor part
41 battery
43 connection point battery
45 automobile rear wheel
46 rear cargo space
47 battery top side
49 gap
51 battery side surface
52 step rearward side
53 step forward side
55 gap
57 step lower end
59 step upper end
61 inclination angle
63 ground clearance
65 ground
67 battery bottom side
L longitudinal direction
H horizontal direction
V vertical direction

The invention claimed is:

1. An automobile comprising:
a body;
a base floor part configured to carry a wheelchair adapted to be connected to the body of the automobile;
a battery configured to provide at least part of a driving force of the automobile, the base floor part being arranged at least partly above the battery, wherein the base floor part includes, in a longitudinal direction of the base floor part:
a rearward wheelchair storage section configured to carry rear wheels and front wheels of the wheelchair;
a forward section arranged at a forward end of the rearward wheelchair storage section; and
a step is formed between the rearward wheelchair storage section and the forward section such that the forward section is stepwise elevated from the forward end of the rearward wheelchair storage section, the step including a planar rearward side facing the wheelchair and a planar forward side facing the battery, wherein a top side of the rearward wheelchair storage section is inclined at an angle between 1% and 15% with respect to a horizontal direction.

2. The automobile according to claim 1, wherein the base floor part comprises a horizontal battery section that includes a horizontal top side and/or a horizontal bottom side.

3. The automobile according to claim 1, wherein the base floor part comprises a horizontal battery section, a length of the battery section is between 10 cm and 30 cm, the base floor part being configured such that the battery section is arrangeable above the battery over an entire length of the battery section.

4. The automobile according to claim 1, wherein a bottom side of the wheelchair storage section is inclined at a same angle with respect to the horizontal direction as the top side of the wheelchair storage section.

5. The automobile according to claim 4, wherein the top side and/or the bottom side has the same inclination angle over an entire length of the wheelchair storage section.

6. The automobile according to claim 1, wherein a length of the wheelchair storage section is shorter than the wheelchair.

7. The automobile according to claim 1, wherein the step comprises a lower end and an upper end, wherein the lower end and/or the upper end is linear and/or extends perpendicular to the longitudinal direction.

8. The automobile according to claim 1, wherein the rearward side and the forward side extending parallel to each other.

9. The automobile according to claim 1, wherein the step is configured to extend in a vertical direction or is inclined with respect to the vertical direction at an angle between 1 and 30°.

10. The automobile according to claim 9, wherein a height of the step in a vertical direction is between 10 mm and 80 mm.

11. The automobile according to claim 1, wherein the forward section, the step, and the rearward wheelchair storage section are manufactured as a single piece.

12. The automobile according to claim 1, wherein a ground clearance between ground and a bottom side of the battery is larger than 165 mm and/or the battery is arranged in an initial position as provided by a manufacturer of the automobile.

13. The automobile according to claim 1, wherein the base floor part comprises a horizontal forward section located forward in a longitudinal direction of the automobile, the forward section being arranged at least partly above the battery.

14. The automobile according to claim 13, wherein the base floor part is arranged above the battery over at least 10% of a length of the base floor part, the forward section being arranged above the battery over at least 50% of a length of the forward section.

15. The automobile according to claim 13, wherein a top side of the battery and at least part of a bottom side of the forward section extend parallel to each other.

16. The automobile according to claim 15, wherein a gap between the bottom side of the forward section and the top side of the battery is between 5 mm and 15 mm.

17. The automobile according to claim 1, wherein the forward section is configured to be arranged at least partly above the battery, the rearward wheelchair storage section being located rearward in the longitudinal direction of the automobile with respect to the forward section that is located forward in the longitudinal direction of the automobile.

18. The automobile according to claim 17, wherein the battery has a predefined shape, a bottom side of the forward section and/or a side surface of the step facing the battery is at least partly adapted to the shape of the battery.

19. The automobile according to claim 17, wherein a gap formed between a side surface of the battery and a forward surface of the step facing the battery is between 5 mm and 15 mm.

20. A system comprising:

a wheelchair; and a base floor part configured to carry the wheelchair and to be connected to an automobile that includes a battery for providing at least part of a driving force of the automobile, wherein:

the base floor part comprises, in a longitudinal direction of the base floor part and/or the automobile, an inclined rear section and a horizontal forward section, the inclined rear section being inclined within respect to the longitudinal direction and configured to carry the wheelchair, a length of the inclined rear section being shorter than the wheelchair such that a footrest of the wheelchair is arranged above the forward section; and at least a portion of the forward section is adapted to a shape of the battery and disposed over the battery in the longitudinal direction.

21. The automobile according to claim 1, wherein the stepwise elevation of the forward section from the forward end of the rearward wheelchair storage section is configured to provide that a footrest of the wheelchair carried by the base floor part is disposed above the forward section.

* * * * *